United States Patent
Brahmbhatt et al.

(10) Patent No.: US 12,255,540 B2
(45) Date of Patent: Mar. 18, 2025

(54) SYNCHRONOUS RECTIFIER SCHEME TO AVOID CROSS-CONDUCTION IN A FLY-BACK CONVERTER

(71) Applicant: Cypress Semiconductor Corporation, San Jose, CA (US)

(72) Inventors: Viral Kishorkumar Brahmbhatt, Vadodara (IN); Arun Khamesra, Bangalore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 182 days.

(21) Appl. No.: 18/186,859

(22) Filed: Mar. 20, 2023

(65) Prior Publication Data
US 2024/0322699 A1  Sep. 26, 2024

(51) Int. Cl.
H02M 3/335 (2006.01)
H02M 1/44 (2007.01)

(52) U.S. Cl.
CPC ......... H02M 3/33592 (2013.01); H02M 1/44 (2013.01)

(58) Field of Classification Search
CPC .............................. H02M 3/33592; H02M 1/44
See application file for complete search history.

(56) References Cited

U.S. PATENT DOCUMENTS

| 10,651,753 B1* | 5/2020 | Khamesra | ............... H02M 7/06 |
| 2006/0214222 A1* | 9/2006 | Challa | ................. H01L 29/7811 |
| | | | 257/E29.066 |

OTHER PUBLICATIONS

Monolithic Power Systems, MP6908A Fast Turn-Off Intelligent Rectifier with No Need for Auxiliary Winding, May 27, 2020, 14 pages.
Texas Instruments Inc., UCC28781 Zero-Voltage-Switching Flyback Controller with Dedicated Synchronous Rectifier Gate-Drive, Dec. 2021, 83 pages.

* cited by examiner

*Primary Examiner* — Adolf D Berhane
*Assistant Examiner* — Afework S Demisse (57) ABSTRACT

A fly-back converter and method of operating is provided to eliminate cross-conduction between a power-switch (PS) on a primary side of a transformer and a synchronous-rectifier (SR) on a secondary side when operating in continuous conduction mode. Generally, the method includes turning on the SR when a drain voltage of the SR drops to a negative voltage followed by a rise in the SR-drain-voltage at a first slope as a current is drawn from the secondary side of the transformer through the SR. When the PS is turned on before the transformer is completely discharged cross-conduction causes a change in the rise of the drain voltage to a second slope greater than the first slope. By turning off the SR within 50 ns of the change in the rise of the drain voltage, cross-conduction is minimized or eliminated without receiving turn-on information from a controller operating the PS.

20 Claims, 9 Drawing Sheets

Turning-off The PS Causing The SR-drain-voltage And Vpin To Quickly Drop To A Negative Voltage, Which Is Detected And SR Is Turned-on On The Secondary Side Of The Transformer

804

Draw Current From The Secondary Side Of The Transformer Through The SR While Generating A First And A Second Derivatives (Deriv1 And Deriv2) Of The Change In Slope Of Vpin

806

Pump Current Into C2 Through MP1

808

Compare The Second Derivative (Deriv2) To Reference Current IREF+1', And Generate And Couple The Detection Signal (Prim_Det), To The Gate Driver Through The Buffer

SYNCHRONOUS RECTIFIER SCHEME TO AVOID CROSS-CONDUCTION IN A FLY-BACK CONVERTER

TECHNICAL FIELD

This disclosure relates generally to switch-mode power supplies or converters, and more particularly to fly-back converters and methods of operating the same to avoid cross-conduction between a primary and secondary switch.

BACKGROUND

Switch-mode power supplies (SMPSs) or converters are used to convert power from an alternating current (AC) source to a direct current (DC) at a specified voltage level. One type of SMPS widely utilized in portable consumer, industrial and medical applications is a fly-back converter. Generally, the fly-back converter can be a primary side controlled (PSC) fly-back converter, secondary side controlled (SSC) fly-back converter or can include controllers on both sides of a transformer.

Figure 1:
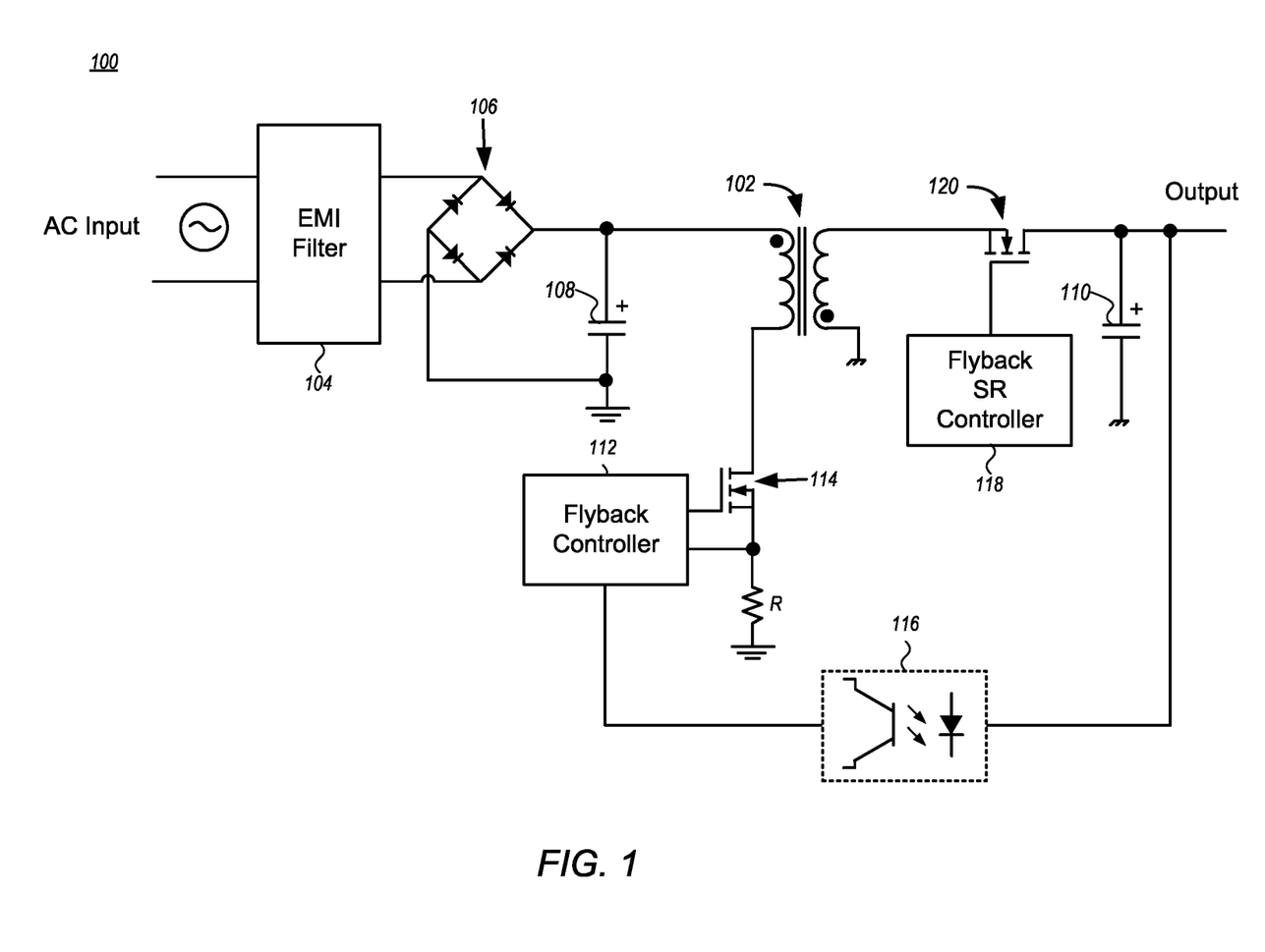
FIG. 1 is a simplified schematic block diagram illustrating a conventional fly-back converter.

Referring to FIG. 1 a conventional fly-back converter 100 generally includes a transformer 102 having a primary side electrically coupled to an AC input through an electromagnetic interference filter (EMI) filter 104 and a rectifying circuit, such as a bridge rectifier 106, and one or more input filter capacitors 108, and a secondary side coupled to a DC output through one or more output capacitors 110. On the primary side of the transformer 102 a fly-back-controller 112 controls an active rectification element or primary side power switch (PS), such as a PS field effect transistor (PS_FET 114) to switch power to the primary side on or off in response to a feedback (FB) signal received from the secondary side through an electrical isolation circuit 116. On the secondary side, a synchronous rectifier (SR) controller 118 senses voltage on the secondary side and turns a synchronous rectifier (SR), such as a SR field effect transistor (SR_FET 120) on and off in response to sensed voltage peaks, negative voltages and zero-crossings.

In operation of the fly-back converter 100, during the time in which the PS_FET 114 is on or closed the SR_FET 120 is off or open, and the fly-back converter is said to be operating in fly-back mode, and a magnetic field builds up in the transformer 102 while a current on the primary side increases linearly. When the PS_FET 114 is off or opened, and SR_FET 120 is on or closed, the fly-back converter 100 transfers the power to secondary side, and the magnetic field begins to collapse while the secondary side current decreases steadily, but gradually as power is given to output capacitor 110 connected until a point is reached at which there is substantially zero current flow in the secondary side.

Generally, the fly-back converters 100 can operate in one of two modes, depending on the power drawn from the DC output and the resultant ON-OFF cycle of the PS_FET 114. If the PS_FET 114 switches from OFF to ON before the flux in the transformer 102 is completely discharged, the current in the primary side of the transformer does not start with zero current. This mode of operation is called continuous conduction mode (CCM). Alternately, if the off time of the PS_FET 114 lasts long enough for the flux in the transformer 102 to completely discharge, then primary side current starts from zero current when PS_FET 114 switches from OFF to ON. This mode of operation is called discontinuous conduction mode (DCM).

One problem with previous generations of fly-back converters 100 operating in CCM is cross-conduction between the PS_FET 114 and the SR_FET 120, which can occur when both the PS_FET and the SR_FET are ON, resulting in a reduced efficiency of the fly-back converter as well as the danger of having high negative current through the SR_FET 120 that can cause large voltage spikes when SR_FET is tuned-off, which can damage or ultimately reduce lifetime of SR_FET of the fly-back converter 100.

Figure 2A:
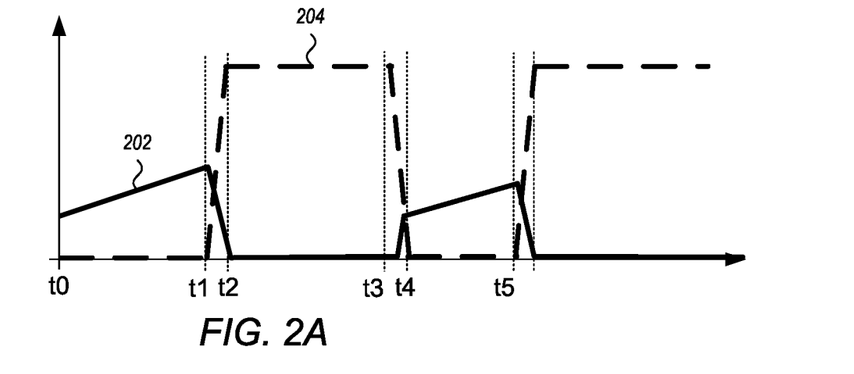
FIG. 2A is a graph showing waveforms of a current through a primary side power switch field effect transistor (PS_FET) and a voltage on the drain of the PS_FET in the fly-back converter of FIG. 1 operating in continuous conduction mode (CCM)
Figure 2B:
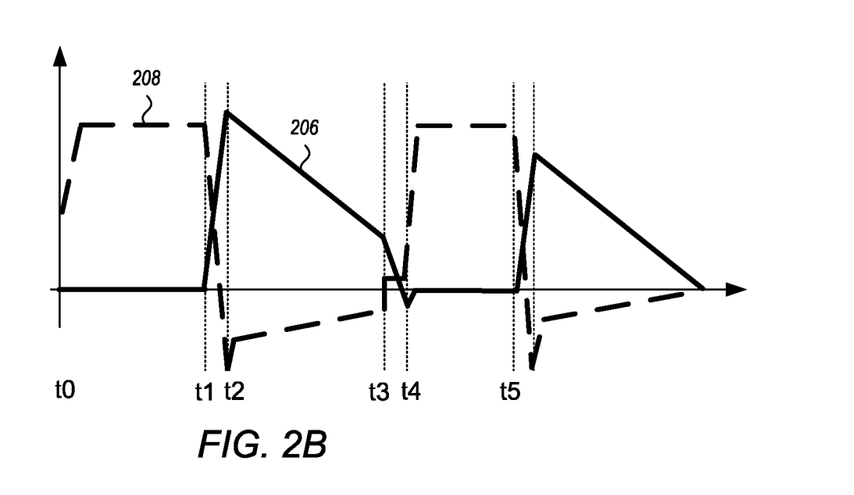
FIG. 2B is a graph showing waveforms of a current through a synchronous rectifier (SR) FET in the fly-back converter of FIG. 1 and a voltage on the drain of the SR_FET operating in CCM.
Figure 2C:
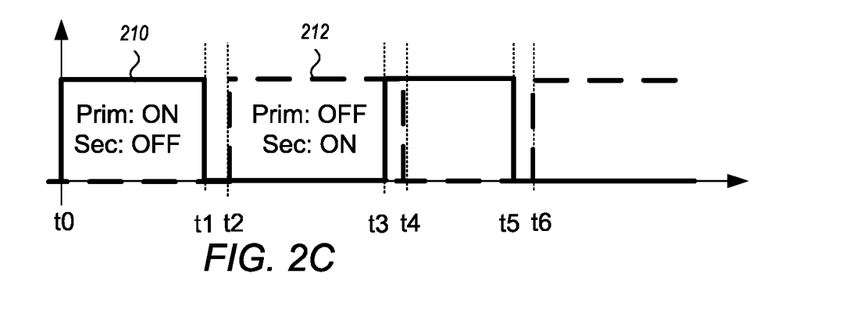
FIG. 2C is a timing diagram illustrating ON and OFF operation of the PS_FET and SR_FET of the fly-back converter of FIG. 1 operating in CCM.

FIG. 2A is a graph showing waveforms of a primary current 202 through the PS_FET 114 and a primary voltage 204 on a drain of the PS_FET in the fly-back converter 100 of FIG. 1 operating in continuous conduction mode (CCM). FIG. 2B shows waveforms of the secondary current 206 through SR_FET 120 and secondary voltage 208 on a drain of the SR_FET during the same time or number of cycles of the PS_FET 114. FIG. 2C is a timing diagram illustrating ON and OFF operation of the PS_FET 114 and the SR_FET 120 of the fly-back converter 100 during CCM operation.

Referring to FIGS. 2A through 2C it is seen that during time t3 to t4, both the PS_FET 114 (represented by line 210) and the SR_FET 120 (represented by line 212) can result in cross-conduction between PS_FET and the SR_FET if the detection of secondary side takes longer to turn-off SR_FET. The rapid changes in secondary current 206 slope with elongated SR_FET remaining ON can result in high negative secondary current (206), resulting in a reduced efficiency of the fly-back converter as well as reliability risk of damaging the SR_FET.

Previous solutions to minimize cross-conduction have relied on passing PS_FET 114 turn-on information to the SR-controller 118 via the electrical isolation circuit 116, direct detection of voltage on the drain of the SR_FET by the SR-controller using high-voltage technology (not shown in FIG. 1), or lowering a threshold at which a negative secondary voltage 208 is detected as approaching zero volts, i.e., a zero crossing detection (ZCD) shown at t3 on the graph of FIG. 2B. These prior solutions are not wholly satisfactory as the first two solutions increase the cost and complexity of the fly-back converter 100, while the last solution decreases the overall efficiency of the converter.

Accordingly there is a need for a fly-back converter and method of operating the same that minimizes or substantially eliminates cross-conduction between a primary and a secondary switch during CCM operation, thereby improving efficiency of the converter. It is further desirable that the circuit architecture and method does so without the need for coupling turn-on information for a PS_FET on the primary to a SR-controller on the secondary side, or a dedicated high-voltage connection between the drain of an SR_FET and the SR-controller.

SUMMARY

A fly-back converter and method of operating the same to minimize or substantially eliminate cross-conduction between a primary side power switch (PS) on a primary side of a transformer and a synchronous rectifier (SR) field effect transistor (SR_FET) on a secondary side when operating in continuous conduction mode (CCM) is provided. Generally, the method includes turning on the SR_FET causing a SR-drain-voltage on a drain of the SR_FET to quickly drop to a negative voltage followed by a slow, steady rise in the SR-drain-voltage at a first slope or rate of change as a current is drawn from the secondary side of the transformer through the SR_FET. Turning on the PS on the primary side of the transformer is before the current drawn from the secondary side of the transformer is completely discharged causes a change in the rate of rise of the SR-drain-voltage to a second slope greater than the first slope. It has been found that turning off the SR_FET within few tens of nanoseconds (ns) (for example, 50 ns) of the change in the rise of the SR-drain-voltage, minimizes or substantially eliminates cross-conduction between the PS and the SR_FET when the fly-back converter is operating in continuous conduction mode. It is further noted that the above method does not depend on receiving turn-on information from a primary side controller operating the PS to turn off the SR_FET.

In one embodiment, the fly-back converter includes a SR-controller on the secondary side including a SR sense pin (SR_PIN) coupled to the drain and a gate driver coupled to a gate of the SR_FET, and turning off the SR_FET includes operating the gate driver to turn off the SR_FET in response to a change in a voltage on the SR_PIN (Vpin) caused by the change in the rise of the SR-drain-voltage. Generally, the SR-controller further includes a zero crossing detector (ZCD) comparator through which the SR_PIN is coupled to the gate driver, and a clamping circuit or active clamp coupled to the SR_PIN. The clamping circuit/active claim is operable to limit or clamp a negative voltage, to which the Vpin voltage on the SR_PIN drops on following turning on the SR_FET, to a clamping voltage (Vclamp) set as a predetermined voltage below a ZCD threshold voltage. Turning off the SR_FET following turning on the PS and consequent rise of the SR-drain-voltage includes comparing the Vpin to the ZCD threshold voltage, and coupling an output from the ZCD comparator to the gate driver to turn off the SR_FET when the ZCD comparator detects the Vpin crossing the ZCD threshold voltage. By initially limiting the Vpin to a maximum negative voltage of Vclamp, the clamp and the ZCD comparator are operable to detect Vpin crossing the ZCD threshold voltage within very fast time for example 20 ns of the change in the rise of the SR-drain-voltage.

In another embodiment, the SR-controller includes a closed-loop differentiator circuit operable to detect the change in the rise of the SR-drain-voltage through the change in the Vpin, and to generate a PS on detection (PS_det) signal to the gate driver, and turning off the SR_FET includes detecting the change in the rise of the SR-drain-voltage, generating the PS_det signal and coupling the PS_det signal to the gate driver to turn off the SR_FET.

Further features and advantages of embodiments of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to a person skilled in the relevant art(s) based on the teachings contained herein.

BRIEF DESCRIPTION OF THE DRAWINGS

Embodiments of the invention will now be described, by way of example only, with reference to the accompanying schematic drawings in which corresponding reference symbols indicate corresponding parts. Further, the accompanying drawings, which are incorporated herein and form part of the specification, illustrate embodiments of the present invention, and, together with the description, further serve to explain the principles of the invention and to enable a person skilled in the relevant art(s) to make and use the invention.

DETAILED DESCRIPTION

A fly-back converter including a fly-back synchronous rectifier (SR) controller with a circuit for rapidly turning off a SR to avoid cross-conduction between the SR and power switch on the primary side during continuous conduction mode (CCM) operation, and methods of operating the same are disclosed for improving efficiency and reliability across a wide range of loads and power delivery applications. The system and methods of the present disclosure are particularly useful in Universal Serial Bus Power Delivery (USB-PD) applications with wide output power applications ranging from 5 W to 100 W, and output voltages from 3.3V to 21.5V (or up to 28V, if Extended Power Range, or EPR, specification is followed).

An embodiment of a fly-back converter including a secondary or Synchronous Rectifier (SR)-controller operable to substantially eliminate cross-conduction when operating in CCM without receiving turn-on information from a primary side or power-switch (PS)-controller in accordance with the present disclosure will now be described with reference to FIG. 3.

Figure 3:
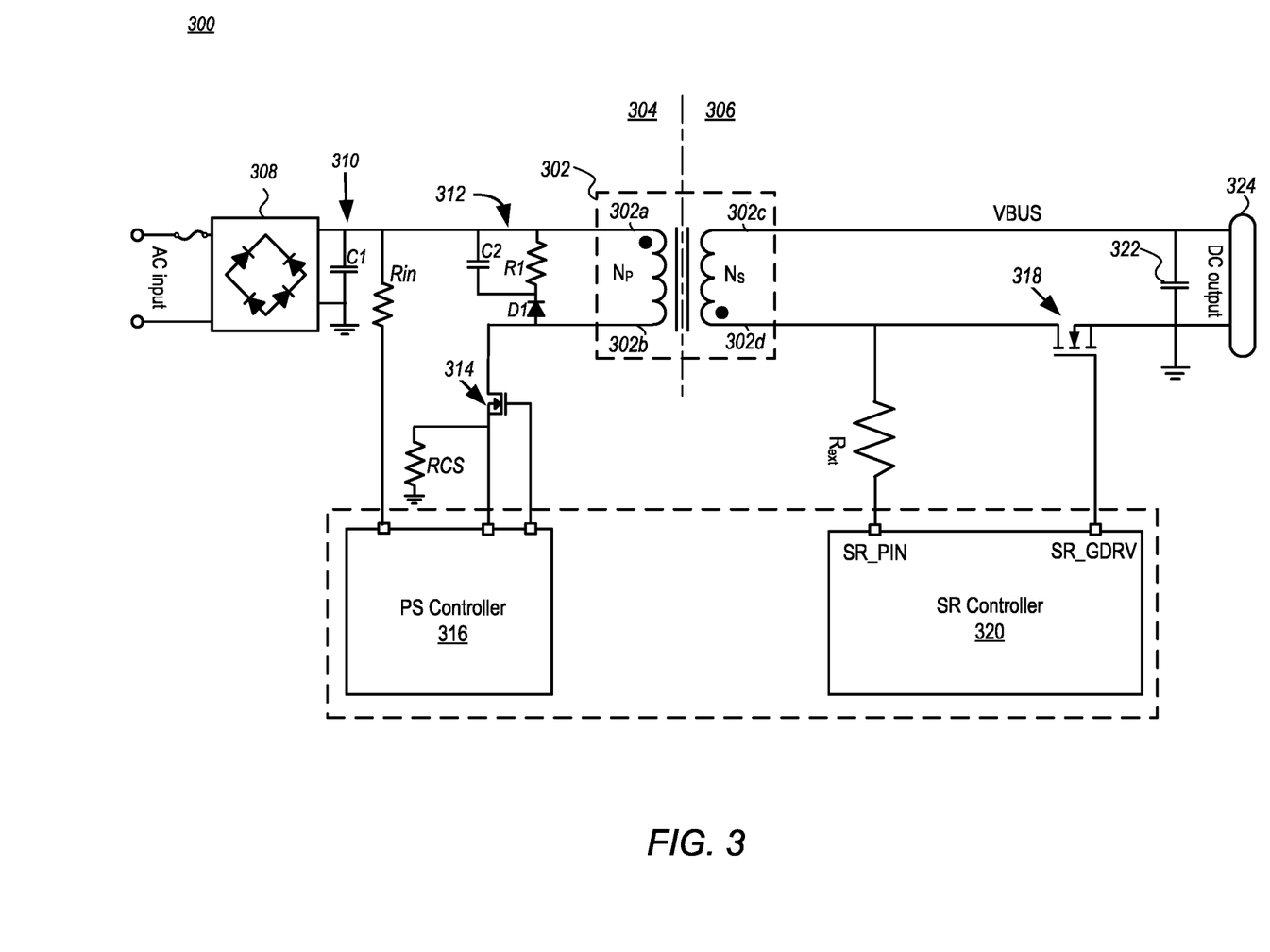
FIG. 3 is a schematic block diagram depicting an embodiment of a fly-back converter including an SR-controller operable to substantially eliminate cross-conduction when operating in CCM without receiving turn-on information from a PS-controller.

Referring to FIG. 3, the fly-back converter 300 generally includes a transformer 302 having a primary winding (NP) on a primary side 304 electrically connected or coupled to an AC input, and a secondary winding (NS) on a secondary side 306 coupled to a DC output.

On the primary side 304 a rectifying circuit, such as a bridge rectifier 308, and one or more input filters coupled to a first terminal 302a of the transformer 302 rectify an AC input voltage and supply input power to the primary winding of the transformer 302. The input filters can include a first input filter 310 having a capacitor (C1) coupled to or across an output of the rectifier 308, and a snubber 312, including a resistor or resistive element (R1) and a capacitor (C2) coupled in parallel between the first terminal 302a of the transformer 302 and a cathode of a diode or rectifier (D1) having an anode coupled to a second terminal 302b of the transformer. Generally, as in the embodiment shown, the fly-back converter 300 further includes a primary or power switch (PS 314), such as a primary field effect transistor (PR_FET), having a first or drain node coupled to the second terminal 302b of the transformer 302, a second or gate node coupled to a primary-side or PS controller 316, and a third or source node coupled to the PS-controller and, through a current sensing element, such as a resistive element (RCS) to ground to sense a primary side current (I_primary) flowing through the primary winding when the PS 314 is closed or conducting. The PS controller 316 is further coupled to the first terminal 302a of the transformer 302 through a resistive element (Rin) to receive a voltage or signal equal or proportional to the rectified AC input voltage.

On the secondary side 306 the fly-back converter 300 includes a secondary-switch or synchronous rectifier (SR 318), such as a synchronous rectifier field effect transistor (SR_FET), coupled between a fourth terminal 302d of the transformer 302 and the ground terminal of the DC output. The first or drain node of the SR 318 is coupled to the fourth terminal 302d of the transformer 302 and through an external resistor (Rext) a SR sense pin (SR_PIN) on the secondary-side or SR-controller 320; a second or gate node coupled to a SR gate drive pin (SR_GDRV) on the SR-controller to drive or control the SR; and a third or source node coupled to the ground terminal of the DC output.

The fly-back converter 300 further includes on the secondary side 306 a filter or output capacitor 322 coupled between a third terminal 302c of the transformer 302 and the ground terminal to provide a DC output voltage to an output interface or connector 324. Although not shown, the output connector 324 is generally further coupled to the SR-controller 320 through a number of communication channels to support various charging protocols. Suitable output connectors 324 can include those compatible with and supporting standard and proprietary charging protocols including Universal Serial Bus Power Delivery USB PD2.0 and USB PD3 with Programmable Power Supply (PPS), Qualcomm® Quick Charge, Samsung® AFC, and Apple® charging protocols. For example, the connector can include a Universal Serial Bus type C (USB-C) compatible connector where the PSC fly-back converter 300 is compliant with the USB protocol to provide a DC output voltage of about 3.3 VDC to about 21.5 VDC at a current of from about 0 to about 5000 milliamps (mA).

It is noted that the PS-controller 316 and the SR-controller 320 may be integrally formed on a single integrated circuit (IC) chip, or as separate IC chips either discretely packaged or packaged together as part of a multichip module.

It is further noted that unlike in conventional fly-back converters, such as shown in FIG. 1, there is no connection through an electrical isolation circuit for coupling turn-on information for the PS 314 from the PS-controller 316 on the primary side 304 to the SR-controller, or any direct, high-voltage connection between the drain of the SR_FET 318 and the SR-controller 320 for sensing the voltage on the drain thereof. By direct it is meant connection other than through a resistive element such as the external resistor Rext.

In accordance with a first embodiment of the present disclosure SR-controller 320 of the fly-back converter 300 includes an active clamping circuit operable to turn OFF the SR 318 to minimize or substantially eliminate cross-conduction when operating in CCM.

Figure 4:
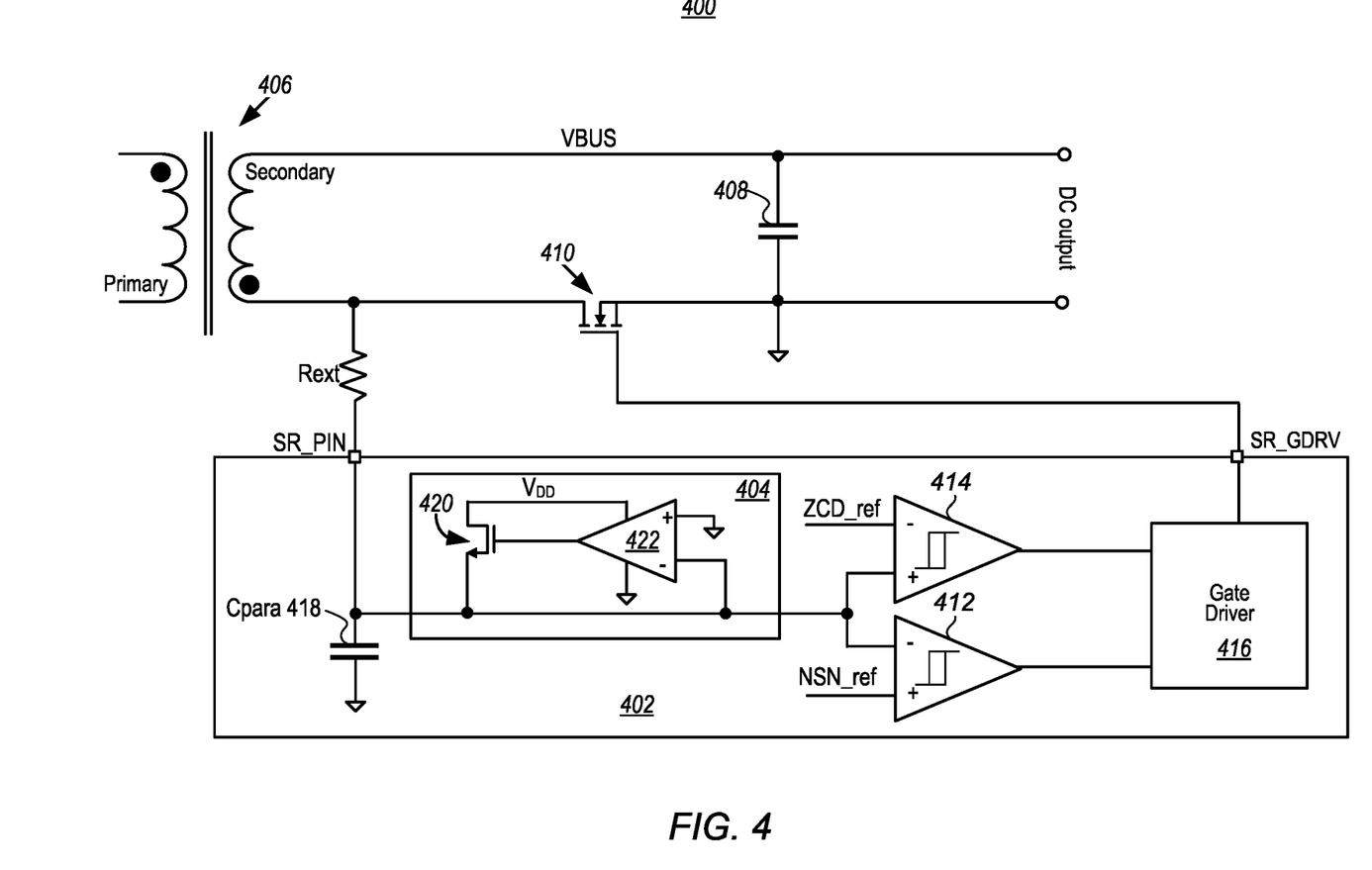
FIG. 4 is a schematic block diagram depicting a partial schematic of a fly-back converter including a SR-controller with an active clamping circuit to minimize or substantially eliminate cross-conduction.

FIG. 4 is a schematic block diagram depicting a partial schematic of a fly-back converter 400 including one such embodiment of a SR-controller 402 with an active clamping circuit 404. As with the fly-back converter described above with respect to FIG. 3, the fly-back converter 400 includes in addition to the SR-controller 402 a transformer 406 having a primary winding coupled to a rectified AC input through a PS, and a secondary winding coupled to a DC output taken across an output capacitor 408 through a synchronous rectifier (SR 410), such as an SR_FET. The SR 410 has a drain coupled to the secondary winding of the transformer 406 and, through an external resistor (Rext) to a SR pad or pin (SR_PIN) on the SR-controller 402, a source coupled to the output capacitor 408 and DC output, and a gate coupled to a gate drive pad or pin (SR_GDRV) on the SR-controller.

Referring to FIG. 4, the SR-controller 402 includes in addition to the active clamping circuit 404, a negative-sensing (NSN) comparator 412, zero-crossing detector (ZCD) comparator 414, and a gate drive circuit or gate driver 416 coupled to the gate of the SR 410 through the SR_GDRV pad or pin.

The NSN comparator 412 has a first, inverting input coupled to the drain of the SR 410 through the SR_PIN and resistor Rext, and a second, non-inverting input coupled to a reference voltage (NSN_REF), generally from −700 millivolts (mV) to +200 mV, and is operable to signal the gate driver 416 to turn-on the SR 410 when a voltage on the drain (SR-drain-voltage) changes from positive to negative.

The ZCD comparator 414 includes a first, inverting input coupled to a reference voltage (ZCD_REF) set at a predetermined voltage below the zero-crossing, generally about −5 mV, and a second, non-inverting input coupled through the SR_PIN and Rext to the to the drain of the SR 410. The ZCD comparator 414 is operable to signal the gate driver 416 to turn-off the SR 410 when a voltage on the SR_PIN (Vpin) has or is about to cross zero-crossing due to a change in SR-drain-voltage caused by cross conduction or turning on of the PS 314 (not shown in this figure) in the primary side in CCM mode or due to current through SR 410 reaching OA in DCM mode.

The gate driver 416 generally includes a number of transistors and voltage supplies including at least a first transistor configured or operable to receive a signal from the NSN comparator 412 to apply a voltage to the gate of the SR_FET to turn on the SR 410, and a second transistor operable to couple the gate of the SR_FET to turn off the SR in response to the signal output by the ZCD comparator 414.

A parasitic internal capacitance ($C_{PARA}$ 418) shown in FIG. 4 coupled between the SR_PIN and ground represents a total stray and parasitic capacitance of components and wiring or leads on SR_PIN in the SR-controller 402. This parasitic capacitance is also present in conventional secondary fly-back controllers in which it is particularly problematic because when the SR-drain-voltage goes up above 0V due to the PS on the primary turning on, the capacitor $C_{PARA}$ must charge up before the voltage on the SR_PIN (Vpin) rises sufficiently to cause the ZCD comparator 414 to signal the gate driver 416 to turn off the SR 410, causing cross-conduction between a PS in the primary side and the SR, resulting a high negative current in the secondary side and consequentially a reduced efficiency as well as possible damage to the fly-back converter.

In contrast, in the SR-controller 402 of the present disclosure the active clamping circuit 404 coupled to the SR_PIN is configured or operable to clamp the voltage on the SR_PIN (Vpin) when the SR 410 is turned on to a clamping voltage (Vclamp) below a predetermined voltage immediately below a ZCD threshold voltage at which the ZCD comparator signals the gate driver 416 to turn off the SR 410. As a result, the active clamping circuit 404, the ZCD comparator 414 and the gate driver 416 are capable of quickly turning off the SR 410 following a rise of a SR-drain-voltage caused by turning on the PS before current drawn from the secondary side of the transformer 406 is completely discharged, thereby minimizing or eliminating cross-conduction between the PS and the SR when the fly-back converter 400 is operating in the CCM. Because the capacitor $C_{PARA}$ 418 only has to charge up from, for example, from −10 mV to 0V, instead of from −200 mV as in a conventional SR controller lacking an active clamping circuit, the voltage on the SR_PIN (Vpin) is able to cross the ZCD threshold within very fast time for example, about 20 nanoseconds (ns), which is detected by ZCD comparator 414 and signal the gate driver 416 to turn off the SR 410. Preferably, the active clamping circuit 404, the ZCD comparator 414 and the gate driver 416 are operable to turn off the SR 410 within very short time for example, about 50 ns, from a sharp rise of the SR-drain-voltage above 0V.

Referring again to FIG. 4, in the embodiment shown the active clamping circuit 404, includes an n-channel field effect transistor (NFET 420) with a drain coupled to a voltage supply ($V_{DD}$), a source coupled to the SR_PIN, and a gate coupled to a differential amplifier (OPAMP 422). The OPAMP 422 includes a first, inverting input coupled to the SR_PIN, a second, non-inverting input coupled to a reference voltage, ground or 0V in the embodiment shown, and implements an offset voltage internally to clamp voltage on the SR_PIN (Vpin) when the SR 410 is turned on to the clamping voltage (Vclamp). When Vpin begins to drop below Vclamp and a difference between Vpin and the reference voltage (ground) the OPAMP 422 turns on the NFET 420, coupling the SR_PIN to $V_{DD}$ drawing a greater current through and a greater voltage across resistor Rext, clamping Vpin to Vclamp. When Vpin rises above Vclamp due to the PS turning on, the OPAMP 422 is operable to turn off the NFET 420, $C_{PARA}$ 418 rapidly charges from Vclamp to the ZCD threshold voltage, and the ZCD comparator 414 signals the gate driver 416 to turn off the SR 410.

A method of operating a fly-back converter 400 with a SR-controller 402 including an active clamping circuit 404 to minimize or substantially eliminate cross-conduction when operating in CCM will now be described with reference to the flowchart of FIG. 5, and the graphs and timing diagrams of FIGS. 6A to 6C.

Figure 5:
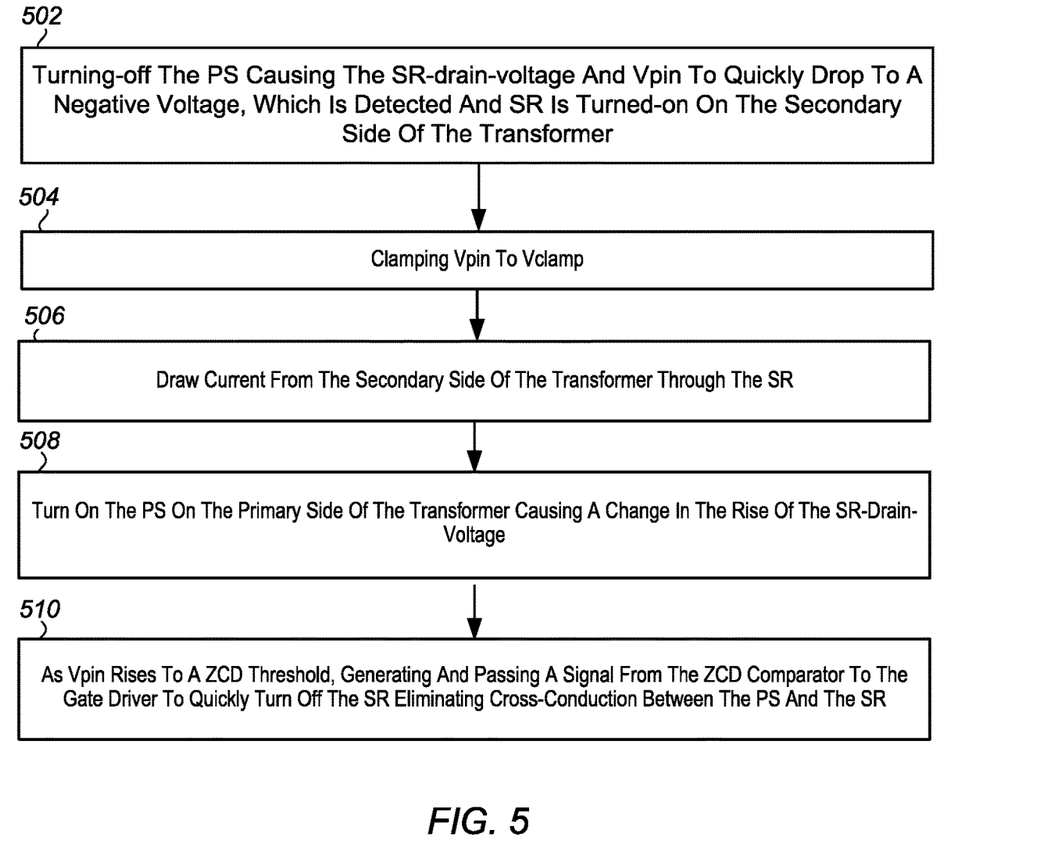
FIG. 5 is a flowchart illustrating an embodiment of a method for operating the fly-back converter of FIGS. 3 and 4 to minimize or substantially eliminate cross-conduction when operating in CCM.
Figure 6A:
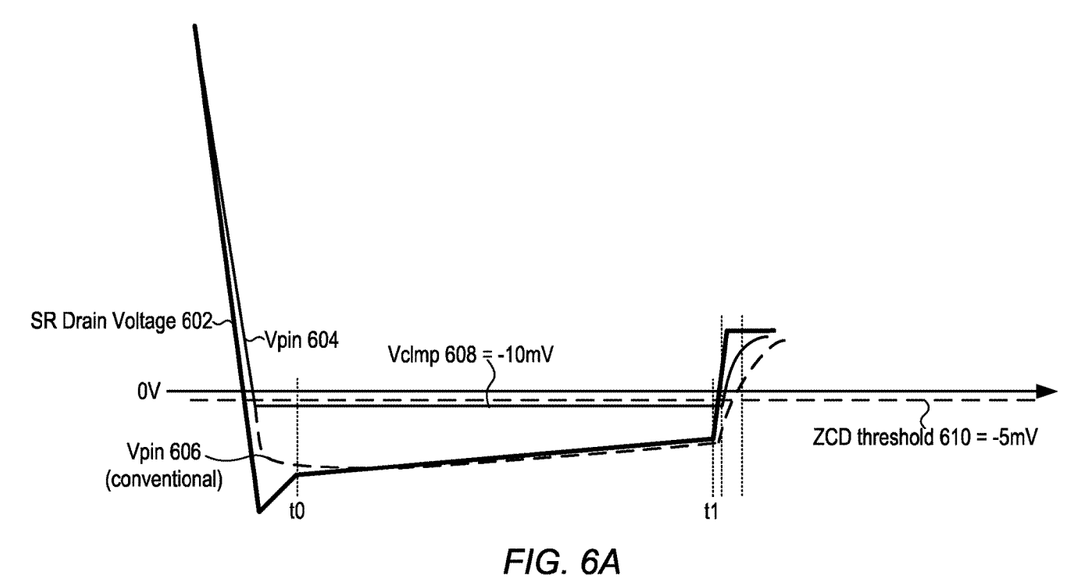
FIG. 6A is a graph of voltage on a drain of the SR of the fly-back converter of FIGS. 3 and 4, and of a voltage on a SR_Pin of the SR-controller of FIG. 4 as compared to that on a SR_PIN of a secondary controller in a conventional fly-back converter.

Referring to FIGS. 5 and 6A, the method begins with turning off of Primary FET causing the SR-drain-voltage 602 and Vpin 604 to quickly drop to a negative voltage (step 502) which is detected and SR is turned-on on the secondary side of the transformer. In a conventional SR controller lacking an active clamping circuit, the voltage on the SR_PIN (conventional Vpin 606) closely follows the drop in the SR-drain-voltage 602 to a substantial negative voltage, for example −200 mV. In the SR controller of FIGS. 3 and 4 however, as noted above when Vpin reaches Vclamp 608 the OPAMP turns on the NFET, coupling the SR_PIN to $V_{DD}$ drawing a greater current through and a greater voltage across resistor Rext, clamping Vpin to Vclamp (step 504).

Next, there is a gradual rise in SR-drain-voltage 602 at a first slope beginning at time to as a current is drawn from the secondary side of the transformer through the SR (step 506). This continues until the secondary side of the transformer is completely discharged, or in continuous conduction mode (CCM) until the PS on the primary side of the transformer is turned on the before the current drawn from the secondary side of the transformer is completely discharged causing a change in the rise of the SR-drain-voltage 602 to a second slope greater than the first slope beginning at time t1 (step 508).

Figure 6B:
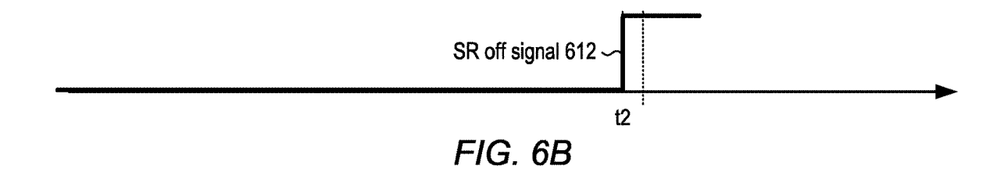
FIG. 6B is a timing diagram illustrating a turn off signal to the SR_FET generated in the SR-controller of FIG. 4 to avoid cross-conduction when operating in CCM.

Referring to FIGS. 5, 6A and 6B, as the SR-drain-voltage 602 rises above Vclamp 608, Vpin 604 also begins to rise to a ZCD threshold 610, causing the ZCD comparator to pass a signal 612 to the gate driver to quickly turn off the SR, minimizing or substantially eliminating cross-conduction between the PS and the SR (step 510). As noted previously because the Vpin 604 is clamped to Vclamp only slightly below the ZCD threshold 610 the voltage on the SR_PIN (Vpin) is able to cross the ZCD threshold within very fast time for example, about 20 ns, and the active clamping circuit, the ZCD comparator and the gate driver are operable to turn off the SR within very short time for example about 50 ns.

Figure 6C:
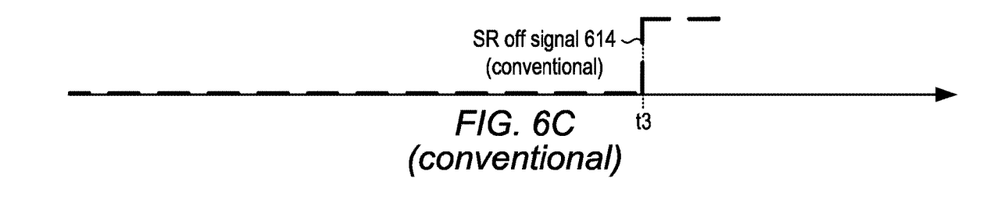
FIG. 6C is a timing diagram illustrating a turn off signal to the SR_FET generated in a conventional fly-back converter.

Referring to FIGS. 6A and 6C, in a conventional SR controller lacking an active clamping circuit, the voltage on the SR_PIN (conventional Vpin 606) must begin rising from a lower, or greater negative voltage, increasing the time required to charge the parasitic capacitor ($C_{PARA}$) taking a significantly greater time of 200 ns for Vpin 606 to cross the ZCD threshold 610, and the ZCD comparator to pass a signal 614 to the gate driver to turn off the SR.

In another embodiment the SR-controller 320 of the fly-back converter 300 includes a closed-loop differentiator circuit operable to detect the change in a rise of a SR-drain-voltage, and to generate a PS-on-detection (PS_det) signal to the gate driver, turning off the SR eliminating cross-conduction between the PS and the SR when operating in CCM.

Figure 7:
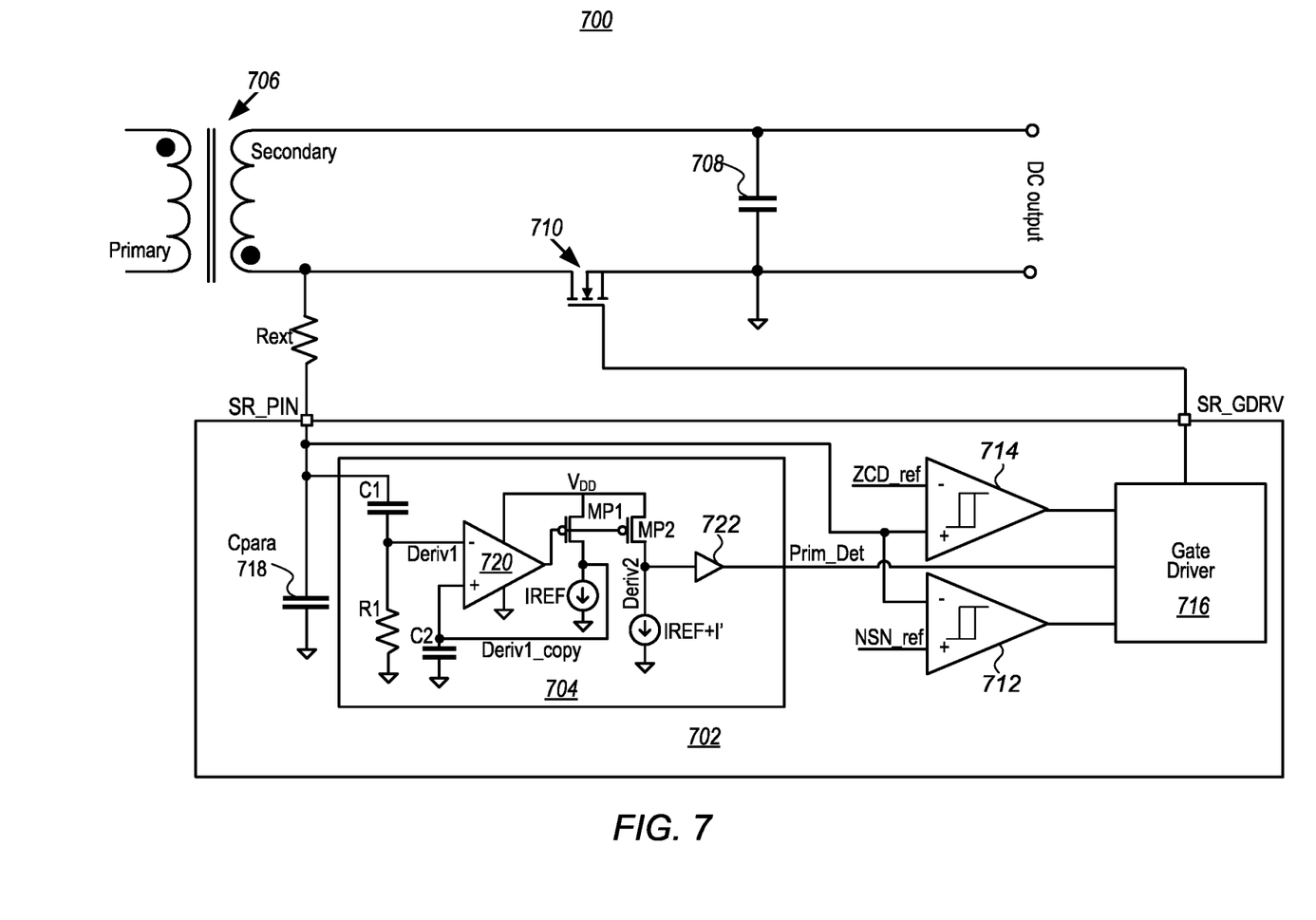
FIG. 7 is a schematic block diagram depicting a partial schematic of a fly-back converter including a SR-controller with a closed-loop differentiator circuit operable to detect the change in the rise in a SR-drain-voltage and to turn off the SR_FET to minimize or substantially eliminate cross-conduction.

FIG. 7 is a schematic block diagram depicting a partial schematic of a fly-back converter 700 including one such embodiment of a SR-controller 702 with a closed-loop differentiator circuit 704. As with the fly-back converter described above with respect to FIG. 3, the fly-back converter 700 includes in addition to the SR-controller 702 a transformer 706 having a primary winding coupled to a rectified AC input through a PS, and a secondary winding coupled to a DC output taken across an output capacitor 708 through a synchronous rectifier (SR 710), such as an SR_FET. The SR 710 has a drain coupled to the secondary winding of the transformer 706 and, through an external resistor (Rext) to a SR pad or pin (SR_PIN) on the SR-controller 702, a source coupled to the output capacitor 708 and DC output, and a gate coupled to a gate drive pad or pin (SR_GDRV) on the SR-controller.

Referring to FIG. 7, the SR-controller 702 includes in addition to the closed-loop differentiator circuit 704, a negative-sensing (NSN) comparator 712, zero-crossing detector (ZCD) comparator 714, and a gate drive circuit or gate driver 716 coupled to the gate of the SR 710 through the SR_GDRV pad or pin.

As with the SR-controller 402 described above with reference to FIG. 4, the NSN comparator 712 has a first, inverting input coupled to the drain of the SR 710 through the SR_PIN and resistor Rext, and a second, non-inverting input coupled to a reference voltage (NSN_REF), generally from −700 millivolts (mV) to +200 mV, and is operable to signal the gate driver 716 to turn-on the SR 710 when a voltage on the drain (SR-drain-voltage) changes from positive to negative.

The ZCD comparator 714 includes a first, inverting input coupled to a reference voltage (ZCD_REF) set a predetermined voltage below the zero-crossing, generally about −5 mV, and a second, non-inverting input coupled through the SR_PIN and Rext to the to the drain of the SR 710. Unlike the ZCD comparator 414 described above with reference to FIG. 4, the ZCD comparator 714 is a discontinuous conduction mode ZCD comparator operable to signal the gate driver 716 to turn-off the SR 710 when a voltage on the SR_PIN (Vpin) has or is about to cross zero-crossing due to a completed discharge of the secondary side of the transformer 706.

The gate driver 716 generally includes a number of transistors and voltage supplies including at least a first transistor configured or operable to receive a signal from the NSN comparator 712 to apply a voltage to the gate of the SR_FET to turn on the SR 710, and a second transistor operable to couple the gate of the SR_FET to turn off the SR in response to the signal output by the ZCD comparator 714 or the PS_det signal output by the closed-loop differentiator circuit 704.

A capacitor ($C_{PARA}$ 718) shown in FIG. 7 coupled between the SR_PIN and ground represents a total stray and parasitic capacitance of components and wiring or leads in the SR-controller 702.

Referring again to FIG. 7, in the embodiment shown the closed-loop differentiator circuit 704, includes a high pass filter through which a first, inverting input of a differentiator is coupled to the SR_PIN, the high pass filter is operable to generate a first derivative of a change in the rise of the Vpin and to couple the first derivative (Deriv1) to a first, inverting input of a differentiator 720. The high pass filter includes a first internal capacitor C1 through which the SR_PIN is coupled to ground, and an output node to the first input of a differentiator between the resistor R1 and capacitor C1. The closed-loop differentiator circuit 704 further includes a first PFET transistor (MP1) with a gate coupled to an output of the differentiator 720, a drain coupled to a voltage supply ($V_{DD}$), and a source coupled to a second, non-inverting input of the differentiator to form a closed loop. The source of transistor MP1 is further coupled to ground through a second capacitor (C2) to generate a first reference current ($I_{REF}$), and the transistor MP1 is operable to charge the capacitor C2 so that a voltage coupled to the second input of the differentiator 720 approaches or forms a copy (Deriv1_copy) of the first derivative coupled to the first input.

The closed-loop differentiator circuit 704 further comprises a second PFET transistor (MP2) with a gate coupled to the output of the differentiator 720, a drain coupled to $V_{DD}$, and a source coupled to ground to via a second reference current ($I_{REF}$+1') and to a logic buffer 722. The second transistor MP2 is operable to generate a second derivative (Deriv2) of the change in the rise of Vpin, and to couple the second derivative to the logic buffer, which is operable to generate and couple the PS_det signal to the gate driver 716.

A method of operating a fly-back converter 700 with a SR-controller 702 including a closed-loop differentiator circuit 704 to minimize or substantially eliminate cross-conduction between a PS on the primary side and a SR on the secondary when operating in CCM will now be described with reference to the flowchart of FIG. 8, and the graphs and timing diagrams of FIGS. 9A to 9E.

Figure 8:
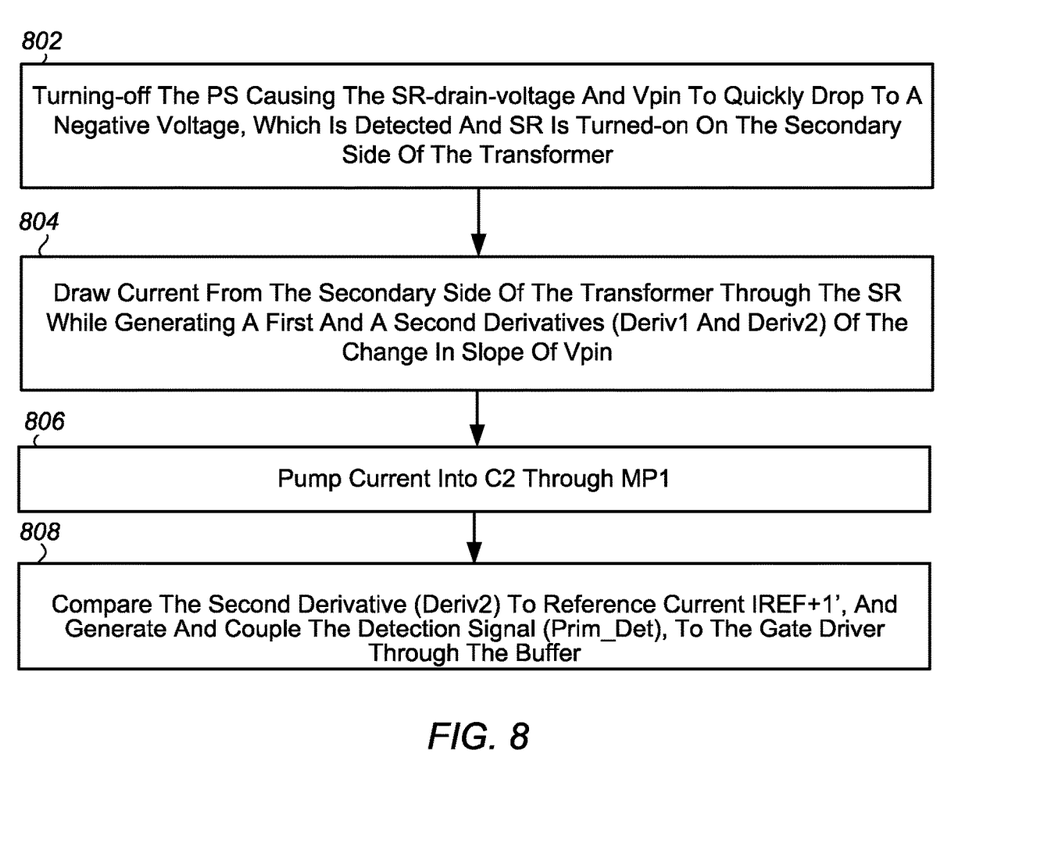
FIG. 8 is a flowchart illustrating an embodiment of a method for operating the fly-back converter of FIGS. 3 and 7 to minimize or substantially eliminate cross-conduction when operating in CCM.
Figure 9A:
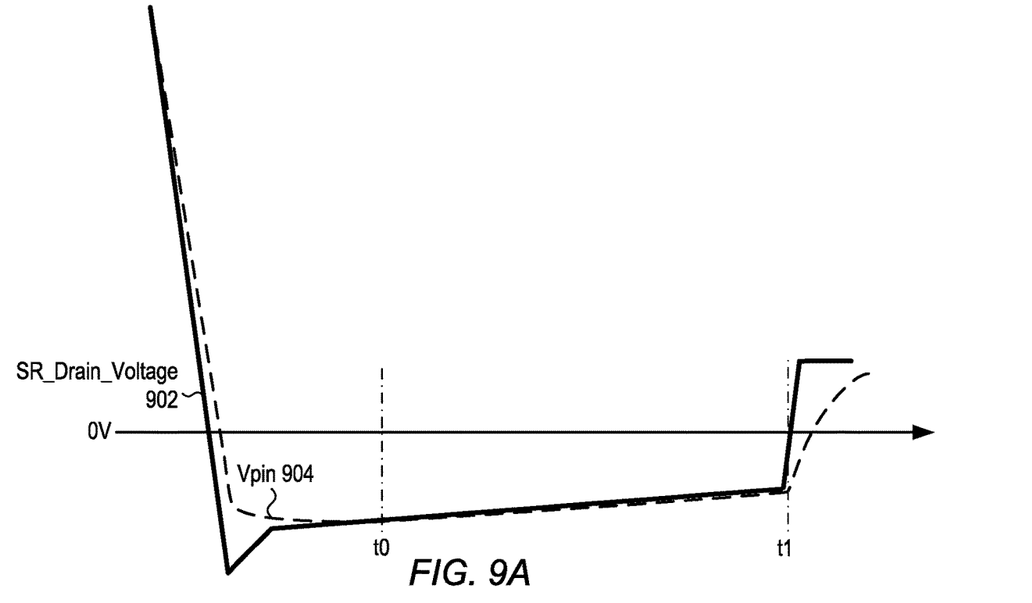
FIG. 9A is a graph of voltage on a drain of the SR_FET of the SR-controller of FIG. 7 operating in CCM, and of a pad voltage on a SR_Pin of the secondary controller.
Figure 9B:
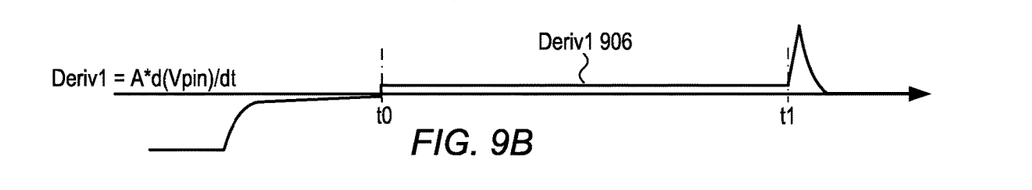
FIG. 9B is a graph showing a first derivative of a change in slope of a voltage on the drain of the SR_FET of the SR-controller of FIG. 7.
Figure 9C:
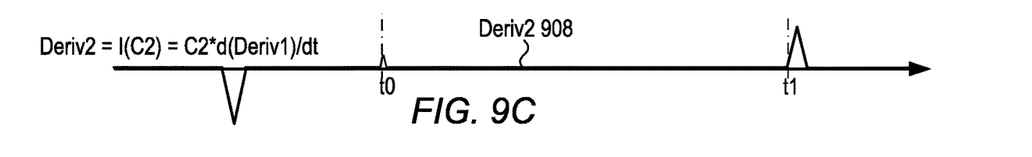
FIG. 9C is a graph showing a second derivative of a change in slope of a voltage on the drain of the SR_FET of the SR-controller of FIG. 7.
Figure 9D:
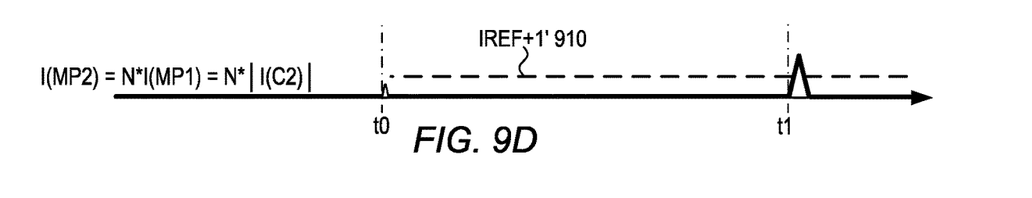
FIG. 9D is a graph showing a comparison of the second derivative to a reference current ($I_{REF}+I'$) in the closed-loop differentiator circuit of the SR-controller of FIG. 7.
Figure 9E:
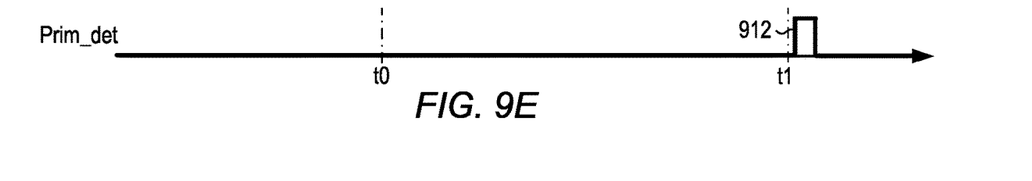
FIG. 9E is a timing diagram illustrating a turn on detection signal (PS_det) generated in the closed-loop differentiator circuit of the SR-controller shown in FIG. 7.

Referring to FIGS. 8 and 9A, the method begins with turning off of Primary FET causing the SR-drain-voltage 902 and Vpin 904 to quickly drop to a negative voltage (step 802) which is detected and SR is turned-on on the secondary side of the transformer. As there is no clamping circuit, the voltage on the Vpin 904) closely follows the drop in the SR-drain-voltage 902 to a substantial negative voltage, for example −200 mV.

Next, there is a gradual rise in SR-drain-voltage 902 at a first slope beginning at time to as a current is drawn from the secondary side of the transformer through the SR, causing the high pass filter formed by C1 and R1 to produce or generate a first derivative (Deriv1 906 in FIG. 9B) of the Vpin, and the differentiator 720 following to produce a second derivative (Deriv2 908) of the Vpin (step 804). During time t0 to t1, Vpin 904 is following SR-drain-voltage generating a constant current in Cpara 718 and C1, resulting in a constant non-zero value of Deriv1 906. Hence, Deriv1_copy settles at the same constant value and I(C2)=0. Deriv1 is equal to or represented by A*d(Vpin)/dt, where A is _R1*C1, and Deriv2 is equal to or represented by I(c2), which is equal to C2*d(Deriv1)/dt.

At t1, as the slope of the SR-drain-voltage 902 changes, although Vpin 904 changes slowly, current through C1 increases immediately, causing Deriv1 906 to shoot up above its constant value. The differentiator 720 starts pumping current into C2 through MP1 in an attempt to make Deriv1_copy on the second non-inverting input of the differentiator equal to Deriv1 906 (step 806). The current through MP2, I (MP2) or Deriv2 908, which is equal to N*I (MP1), is compared against current IREF+1' 910 to generate the detection signal (Prim_det 912), and the signal coupled through buffer 722 to the gate driver 716 (step 808). After the SR 710 turns off and SR-drain-voltage 902 becomes constant, IREF slowly discharges derive1_copy to 0V. The current IREF at time t0 is designed such that, for a positive value of Deriv1 (for example, less than 1 mV) the signal Prim_det 912 does not trip the differentiator 720.

Thus, a fly-back converter including a SR controller to minimize or substantially eliminate cross-conduction between a PS on a primary side and a SR on a secondary side when operating in CCM have been disclosed. Embodiments of the present invention have been described above with the aid of functional and schematic block diagrams illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

It is to be understood that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The breadth and scope of the present invention should not be limited by any of the above-described exemplary embodiments, but should be defined only in accordance with the following claims and their equivalents.

What is claimed is:

1. A method of operating a fly-back converter, the method comprising:
    turning on a synchronous-rectifier (SR) field effect transistor (SR_FET) on a secondary side of a transformer when a SR-drain-voltage on a drain of the SR_FET quickly drops to a negative voltage, followed by a gradual rise in the SR-drain-voltage at a first slope as a current is drawn from the secondary side of the transformer through the SR_FET;
    turning on a power-switch (PS) in a primary side of the transformer before the current drawn from the secondary side of the transformer is completely discharged causing a change in the rise of the SR-drain-voltage to a second slope greater than the first slope; and
    turning off the SR_FET following the change in the rise of the SR-drain-voltage, eliminating cross-conduction between the PS and the SR_FET when the fly-back converter is operating in a continuous conduction mode,
    wherein turning off the SR_FET does not depend on receiving turn-on information from the PS.

2. The method of claim 1 wherein the fly-back converter comprises a SR-controller on the secondary side including a gate driver, and wherein turning off the SR_FET comprises operating the gate driver to turn off the SR_FET in response to a change in a voltage (Vpin) on a SR_PIN coupled to the drain caused by the change in the rise of the SR-drain-voltage.

3. The method of claim 2 wherein the SR-controller further comprises a zero crossing detector (ZCD) comparator and a clamp, and wherein turning on the SR_FET comprises the clamp clamping the Vpin to a clamping voltage (Vclamp) below a ZCD threshold voltage, and turning off the SR_FET comprises the ZCD comparator comparing the Vpin to the ZCD threshold voltage and coupling a signal from the ZCD comparator to the gate driver to turn off the SR_FET when the ZCD comparator detects the Vpin crossing the ZCD threshold voltage.

4. The method of claim 3 wherein the clamp and the ZCD comparator are operable to detect Vpin crossing the ZCD threshold voltage within very less time, for example, 20 nanoseconds (ns) of the change in the rise of the SR-drain-voltage.

5. The method of claim 2 wherein the SR-controller further comprises a closed-loop differentiator circuit operable to detect the change in the rise of the SR-drain-voltage through a change in a rise of the Vpin, and to generate a PS on detection (PS_det) signal to the gate driver, and wherein turning off the SR_FET comprises the closed-loop differentiator circuit detecting the change in the rise of the Vpin, generating the PS_det signal and coupling the PS_det signal to the gate driver to turn off the SR_FET.

6. The method of claim 5 wherein the closed-loop differentiator circuit includes a high pass filter, and wherein turning off the SR_FET comprises generating with the high pass filter a first derivative of the change in the rise of the Vpin and coupling the first derivative to the first input of the differentiator.

7. The method of claim 6 wherein the closed-loop differentiator circuit further comprises a closed-loop including a first transistor (MP1) and a capacitor (C2) coupled to ground to generate a first reference current ($I_{REF}$), and wherein turning off the SR_FET comprises charging the capacitor through the first transistor so that a voltage coupled to the second input approaches the first derivative coupled to the first input of the differentiator.

8. The method of claim 7 wherein the closed-loop differentiator circuit further comprises a second transistor (MP2) to generate a second reference current ($I_{REF}+1'$) and a logic buffer, and wherein turning off the SR_FET comprises generating by the second transistor a second derivative of the change in the rise of the Vpin, and coupling the second derivative to the logic buffer to generate the PS_det signal.

9. A fly-back converter comprising:
    a transformer having a primary winding coupled to a rectified AC input through a primary side power switch (PS), and a secondary winding coupled to a DC output through a synchronous rectifier (SR) field effect transistor (SR_FET), the SR_FET having a drain coupled to the secondary winding, and a source coupled to the DC output; and
    a SR-controller operable to control the SR_FET, the SR-controller comprising:
        a SR sense pin (SR_PIN) coupled to the drain;
        a gate driver coupled to a gate of the SR_FET;
        a zero crossing detector (ZCD) comparator through which the SR_PIN is coupled to the gate driver; and
        a clamp coupled to the SR_PIN operable to clamp a voltage (Vpin) on the SR_PIN to a clamping voltage (Vclamp) below a ZCD threshold voltage when the SR_FET is turned on.

10. The fly-back converter of claim 9 wherein the clamp, the ZCD comparator and gate driver are operable to turn off the SR_FET following a change in a rise of a SR-drain-voltage on the drain caused by turning on the PS before current drawn from the secondary winding of the transformer is completely discharged, eliminating cross-conduction between the PS and the SR_FET when the fly-back converter is operating in a continuous conduction mode.

11. The fly-back converter of claim 10 wherein the clamp, the ZCD comparator and gate driver are operable to turn off the SR_FET within 50 nanoseconds (ns) of a change in a rise of the SR-drain-voltage.

12. The fly-back converter of claim 10 wherein the clamp comprises an n-channel field effect transistor (NFET) with a drain coupled to a voltage supply ($V_{DD}$), a source coupled to the SR_PIN, and a gate coupled to a differential amplifier (OPAMP), the OPAMP having a first input coupled to a reference voltage and a second input coupled to the SR_PIN.

13. The fly-back converter of claim 12 wherein the drain is coupled to the SR_PIN through a resistor (Rext), and when the Vpin approaches Vclamp the OPAMP is operable to turn on the NFET to increase current through the resistor to clamp the Vpin to Vclamp.

14. The fly-back converter of claim 13 wherein the SR_PIN is further coupled to a capacitance (Cpara), and when the Vpin rises above Vclamp, OPAMP is operable to turn off the NFET, Cpara charges from Vclamp to the ZCD threshold voltage, and the ZCD comparator signals the gate driver to turn off the SR_FET.

15. A fly-back converter comprising:
a transformer having a primary winding coupled to a rectified AC input through a primary side power switch (PS), and a secondary winding coupled to a DC output through a synchronous rectifier (SR) field effect transistor (SR_FET), the SR_FET having a drain coupled to the secondary winding, and a source coupled to the DC output; and
a SR-controller operable to control the SR_FET, the SR-controller comprising:
a SR sense pin (SR_PIN) coupled to the drain;
a gate driver coupled to a gate of the SR_FET; and
a closed-loop differentiator circuit operable to detect a change in a rise of a SR-drain-voltage through a change in a rise of a voltage (Vpin) on the SR_PIN, and to generate a PS-on-detection (PS_det) signal to the gate driver, to turn off the SR_FET following the change in the rise of Vpin caused by turning on the PS before current drawn from the secondary winding of the transformer is completely discharged, and to eliminate cross-conduction between the PS and the SR_FET when the fly-back converter is operating in a continuous conduction mode.

16. The fly-back converter of claim 15 wherein the closed-loop differentiator circuit includes a high pass filter through which a first input of a differentiator is coupled to the SR_PIN, and wherein the high pass filter is operable to generate a first derivative of the change in the rise of the Vpin and couple the first derivative to the first input of the differentiator.

17. The fly-back converter of claim 16 wherein the drain of the SR_FET is coupled to the SR_PIN through a resistor (Rext), and wherein the high pass filter comprises the resistor and an internal capacitance through which the SR_PIN coupled to ground, with an output node of the high pass filter to the first input of a differentiator between the resistor and the internal capacitance.

18. The fly-back converter of claim 16 wherein the closed-loop differentiator circuit further comprises a closed-loop including a first transistor (MP1) with a gate coupled to an output of the differentiator, a drain coupled to a voltage supply ($V_{DD}$), and a source coupled to a second input of the differentiator and through a capacitor (C2) to ground to generate a first reference current ($I_{REF}$), and wherein the first transistor is operable to charge the capacitor so that a voltage coupled to the second input of the differentiator approaches the first derivative coupled to the first input.

19. The fly-back converter of claim 18 wherein the closed-loop differentiator circuit further comprises a second transistor (MP2) with a gate coupled to the output of the differentiator, a drain coupled to $V_{DD}$, and a source coupled to ground to generate a second reference current ($I_{REF}+1'$) and to a logic buffer, and wherein the second transistor is operable to generate a second derivative of the change in the rise of the Vpin, and coupling the second derivative to the logic buffer to generate the PS_det signal.

20. The fly-back converter of claim 15 wherein the closed-loop differentiator circuit and the gate driver are operable to turn off the SR_FET within 50 nanoseconds (ns) of the change in the rise of the SR-drain-voltage.

* * * * *